United States Patent
Saito

(10) Patent No.: US 8,531,708 B2
(45) Date of Patent: Sep. 10, 2013

(54) BOOKBINDING PRINTING SYSTEM IN WHICH A PLURALITY OF BOUND PRODUCTS ARE GENERATED BY A SINGLE JOB

(75) Inventor: Kazuyuki Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 13/165,026

(22) Filed: Jun. 21, 2011

(65) Prior Publication Data
US 2012/0033252 A1     Feb. 9, 2012

(30) Foreign Application Priority Data
Aug. 6, 2010 (JP) ................................. 2010-178078

(51) Int. Cl.
*G06F 3/12* (2006.01)
(52) U.S. Cl.
USPC ........................................................ 358/1.15
(58) Field of Classification Search
None
See application file for complete search history.

(56) References Cited

U.S. PATENT DOCUMENTS
6,456,732 B1 * 9/2002 Kimbell et al. ............... 382/112
2009/0232622 A1 * 9/2009 Okada et al. ................... 412/42

FOREIGN PATENT DOCUMENTS
JP          5-208573 A      8/1993

* cited by examiner

*Primary Examiner* — Jeremiah Bryar
(74) *Attorney, Agent, or Firm* — Fitzpatrick, Cella, Harper & Scinto

(57) ABSTRACT

An information processing apparatus comprises: a data determination unit configured to determine, using first received data as a reference, whether to add another received data to processing in a single job; a size determination unit configured, when the data determination unit determines to add the other received data in a bookbinding mode in which a plurality of bound products are generated by a single job, to regard, as single tentative image data, a plurality of image data which are generated from different received data and laid out on a single sheet of paper, and to determine whether the single tentative image data fits in the sheet of paper; and a job generation unit configured to generate a job for at least one received data corresponding to image data contained in the single tentative image data determined by the size determination unit to fit in the sheet of paper.

9 Claims, 15 Drawing Sheets

F I G. 12
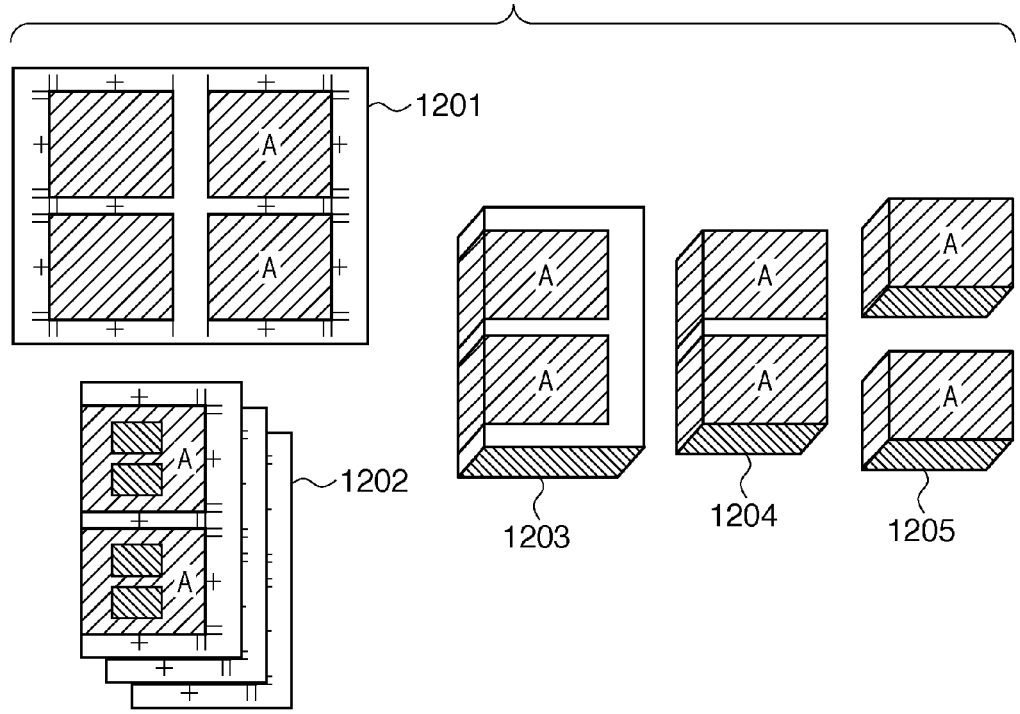
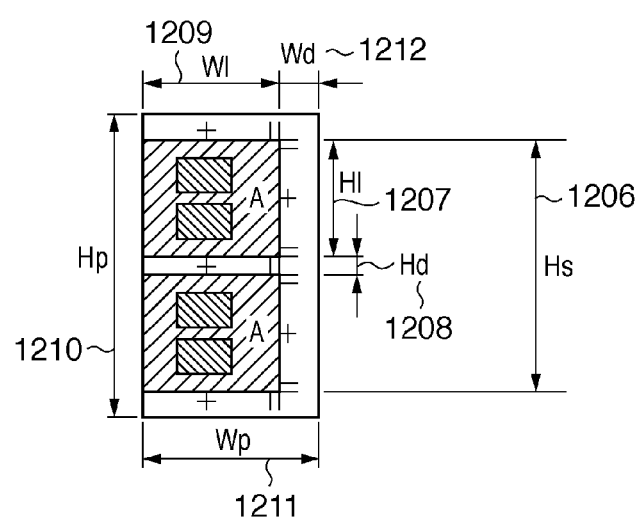

FIG. 13
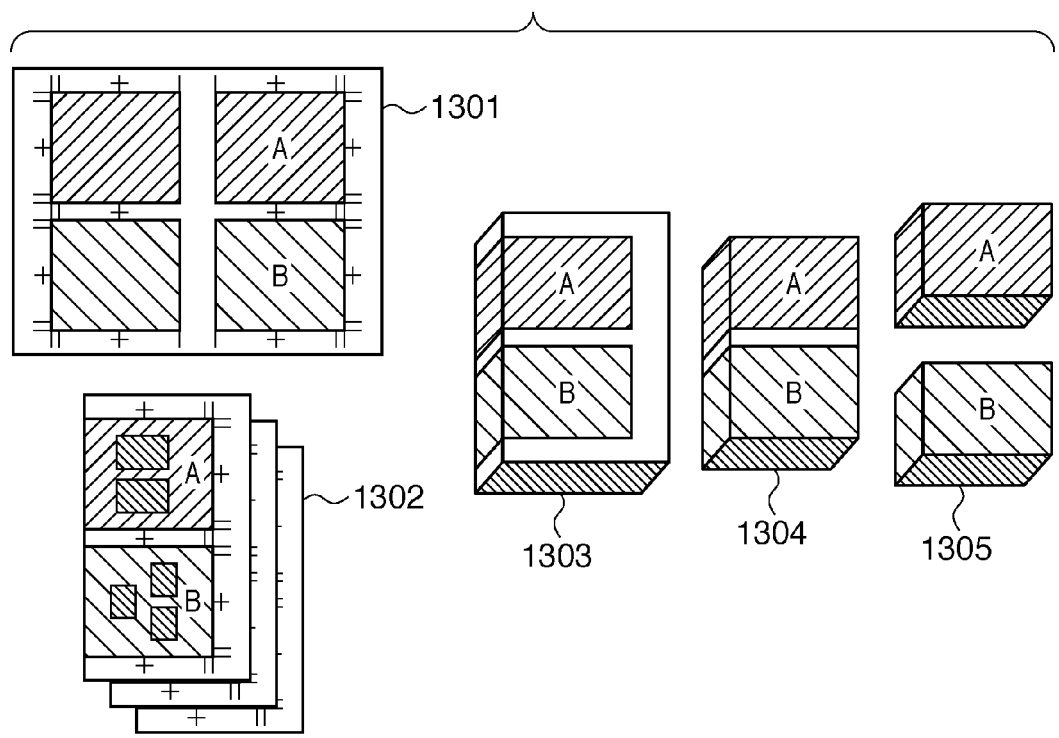
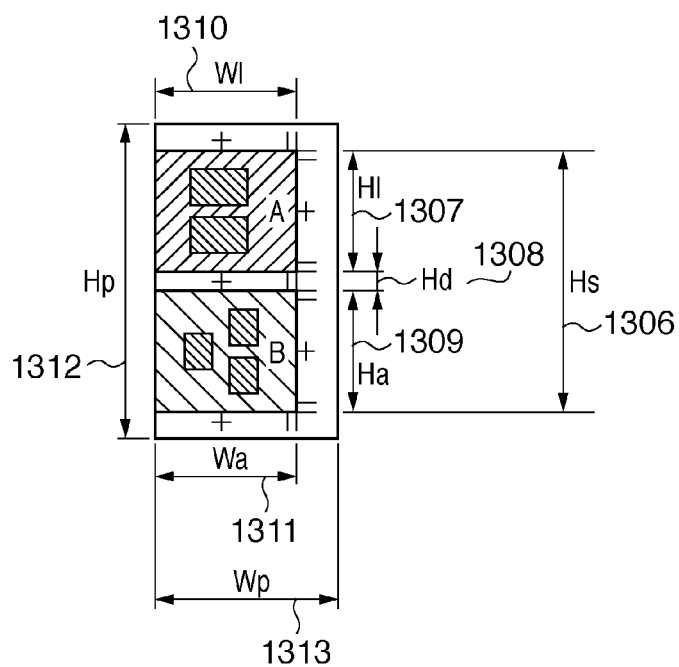

BOOKBINDING PRINTING SYSTEM IN WHICH A PLURALITY OF BOUND PRODUCTS ARE GENERATED BY A SINGLE JOB

BACKGROUND OF THE INVENTION

1. Field of the Invention

The present invention relates to an information processing apparatus, bookbinding printing method, and computer-readable medium for printing and binding images.

2. Description of the Related Art

To print one received data by a plurality of copies, a conventional bookbinding technique lays out image data of a single document on a single sheet of paper a plurality of number of times, and performs print processing (see, for example, Japanese Patent Laid-Open No. 5-208573).

SUMMARY OF THE INVENTION

The conventional technique lays out image data of a single document on a single sheet of paper, and can print one received data a plurality of copies. However, this technique does not consider received data from a user who wants only one booklet, like a photobook. If a plurality of orders, each for only one booklet, are combined to lay out pages of a plurality of received data side by side on a single sheet of paper, a mismatch between designated paper types or a mismatch in the number of pages between booklets may occur, generating a product the user does not want. For an order of only one booklet, only one received data needs to be laid out on paper to create one booklet. This results in wasted paper and poor work efficiency. Therefore, the present invention provides a mechanism to easily generate a printing job to finish a plurality of booklets when laying out pages on a single sheet of paper using a plurality of received data.

According to one aspect of the present invention, there is provided an information processing apparatus which generates, from received data, a job containing a plurality of image data to be printed, a printing instruction, and a bookbinding instruction, and outputs the job to a printing apparatus and post-processing apparatus for generating a bound product, comprising: a data determination unit configured to determine, using first received data as a reference, whether to add another received data to processing in a single job; a size determination unit configured, when the data determination unit determines to add the other received data in a bookbinding mode in which a plurality of bound products are generated by a single job, to regard, as single tentative image data, a plurality of image data which are generated from different received data and laid out on a single sheet of paper, and to determine whether the single tentative image data fits in the sheet of paper; and a job generation unit configured to generate a job for at least one received data corresponding to image data contained in the single tentative image data determined by the size determination unit to fit in the sheet of paper.

According to another aspect of the present invention, there is provided a bookbinding printing method of generating, from received data, a job containing a plurality of image data to be printed, a printing instruction, and a bookbinding instruction, and outputting the job to a printing apparatus and post-processing apparatus for generating a bound product, comprising: a data determination step of causing a data determination unit to determine, using first received data as a reference, whether to add another received data to processing in a single job; a size determination step of causing a size determination unit to, when the other received data is determined in the data determination step to be added in a bookbinding mode in which a plurality of bound products are generated by a single job, regard, as single tentative image data, a plurality of image data which are generated from different received data and laid out on a single sheet of paper, and determine whether the single tentative image data fits in the sheet of paper; and a job generation step of causing a job generation unit to generate a job for at least one received data corresponding to image data contained in the single tentative image data determined in the size determination step to fit in the sheet of paper.

According to another aspect of the present invention, there is provided a non-transitory computer-readable medium storing a program for causing a computer to function as a data determination unit which determines, using first received data as a reference, whether to add another received data to processing in a single job, a size determination unit which, when the data determination unit determines to add the other received data in a bookbinding mode in which a plurality of bound products with different contents are generated by a single job, regards, as single tentative image data, image data with the same page number which are laid out on a single sheet of paper out of a plurality of image data generated from different received data, and determines whether the single tentative image data fits in the sheet of paper, and a job generation unit which generates a job for at least one received data corresponding to image data contained in the single tentative image data determined by the size determination unit to fit in the sheet of paper.

According to the present invention, a product the user wants can be reliably created even for an order for only one booklet from an individual user, like a photobook. In addition, reduction in waste of paper, an increase in work efficiency, and the like can be achieved.

Further features of the present invention will become apparent from the following description of exemplary embodiments (with reference to the attached drawings).

BRIEF DESCRIPTION OF THE DRAWINGS

FIG. 12 is a schematic view showing the process of bookbinding in the second bookbinding mode according to the first embodiment;

FIG. 13 is a schematic view showing the process of bookbinding in the third bookbinding mode according to the first embodiment;

DESCRIPTION OF THE EMBODIMENTS

First Embodiment

[System Configuration]

Figure 1:
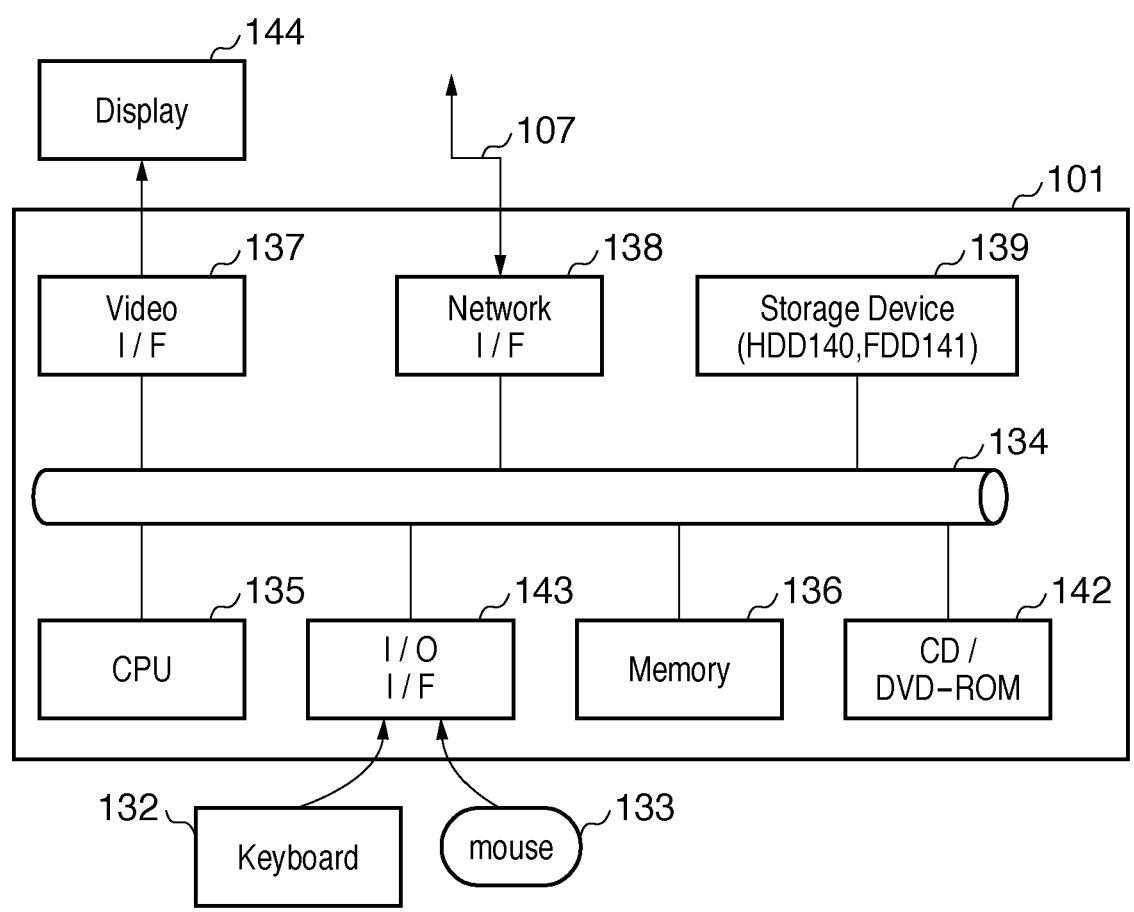
FIG. 1 is a block diagram of the H/W configuration of a computer to which the present invention is applicable.

FIG. 1 exemplifies a system configuration capable of executing a bookbinding printing method according to the first embodiment. A computer 101 connects an input device including a keyboard 132 and a pointing device such as a mouse 133 via an I/O interface 143, and a display 144 via a Video interface 137. A network interface 138 connects the computer 101 to a network connection 107 to enable communication with another computer apparatus. Typical examples of the network connection 107 are a local area network (LAN) and wide area network (WAN).

As a typical arrangement example, the computer 101 includes a central processing unit (CPU) 135, and a memory 136 formed from a random access memory (RAM) or read-only memory (ROM). A storage device 139 typically includes a hard disk drive (HDD) 140 and Floppy® disk drive 141. Although not shown, a magnetic tape drive or the like is also available. A CD-ROM drive 142 is provided as a nonvolatile data source. The computer 101 uses the CD-ROM drive 142 under the control of an operating system (OS) and the CPU 135 of the computer 101 which communicates via an interconnection bus 134. Note that the above configuration is merely an example, and the present invention is applicable to any system having the arrangement of a general information processing apparatus. Assume that the computer 101 to which the present invention is applicable is connected via the network connection 107 to an MFP (Multiple Function Peripheral: not shown) that serves as a printing apparatus, a finisher (not shown) serving as a post-processing apparatus, and the like.

Software programs which implement sequences shown in flowcharts according to the embodiment of the present invention are stored in a computer-readable medium including the above-mentioned storage device. These software programs are loaded from the computer-readable medium into the computer, and executed by the CPU 135 of the computer 101. By using a computer program product, the computer can operate as an apparatus advantageous to printing & bookbinding job generation processing control.

Figure 2:
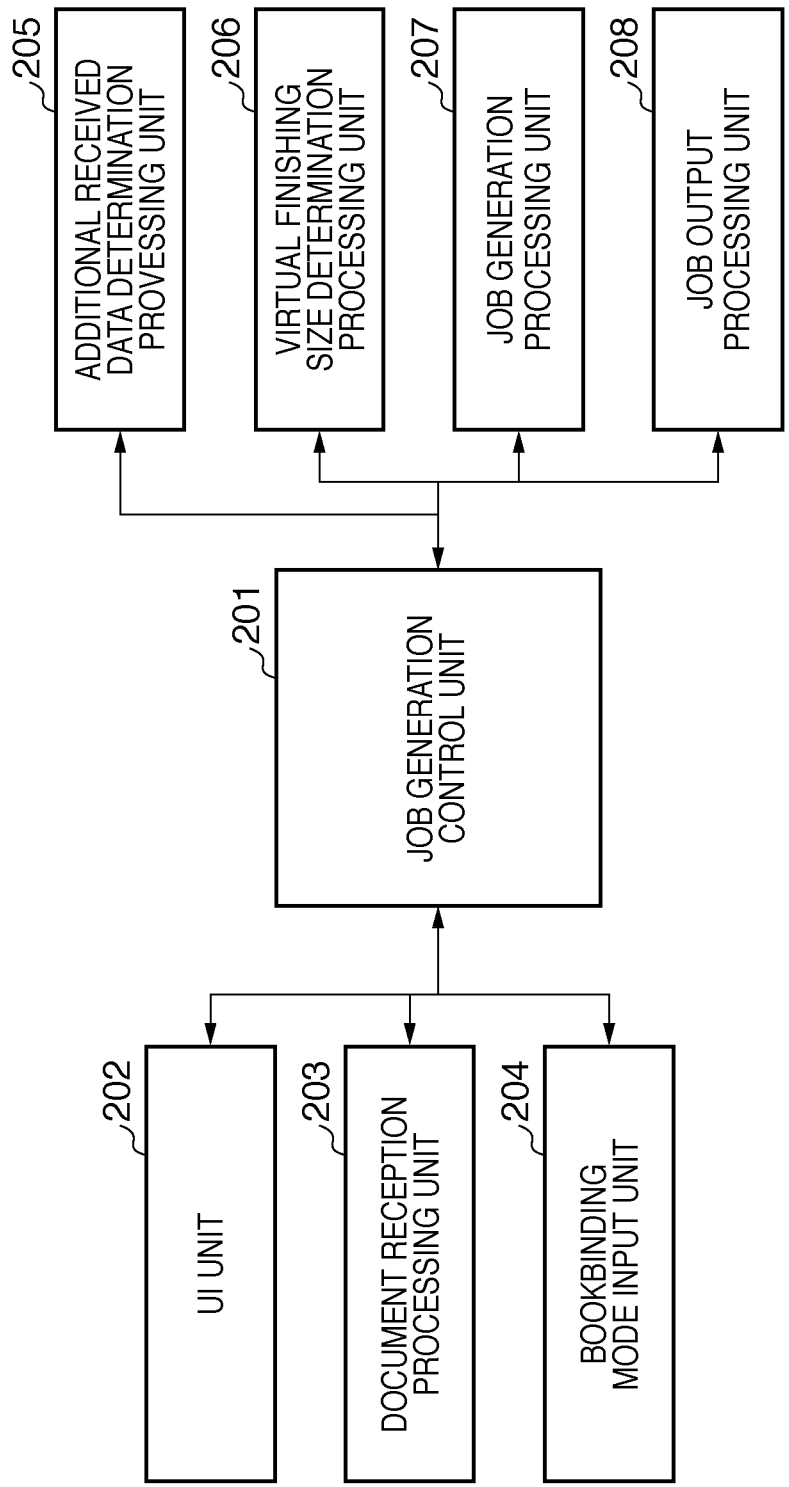
FIG. 2 is a block diagram for explaining the software modules of an apparatus according to the first embodiment.

FIG. 2 exemplifies the arrangement of software modules in the computer 101 functioning as a printing & bookbinding job generation apparatus (to be referred to as the printing & bookbinding job generation apparatus 101) in the embodiment. The printing & bookbinding job generation apparatus 101 includes the following units. A job generation control unit 201 controls processing of each software module and a data flow. A UI unit 202 accepts an input or output from the operator. A document reception processing unit 203 processes input of received data. A bookbinding mode input unit 204 accepts input of a bookbinding mode selected by the operator via the UI unit 202. An additional received data determination processing unit 205 determines whether received data to be added (to be referred to as additional received data) can be added in processing of a single job. A virtual finishing size determination processing unit 206 calculates a virtual finishing size and determines whether it fits in a paper size for use. The virtual finishing size indicates the finishing size of a bound product when image data which are generated from one or more received data and laid out on paper are tentatively regarded as single image data. The calculation method and use of the virtual finishing size will be described later. A job generation processing unit 207 generates a printing & bookbinding job formed from image data for printing, a printing instruction, and a bookbinding instruction. A job output processing unit 208 outputs, as a job, imposed image data and a processing instruction to the printing apparatus.

[Processing Sequence]

(Overall Sequence)

Processing by the printing & bookbinding job generation apparatus 101 in the embodiment will be explained with reference to the flowcharts of FIGS. 3 to 10. Note that the programs of these sequences by the printing & bookbinding job generation apparatus 101 are executed by the CPU 135 after the sequences shown in these flowcharts are stored in any storage unit such as the RAM or ROM (memory 136) or the HDD 140 and then read out.

The overall processing sequence will be explained with reference to FIG. 3. When the processing starts, the document reception processing unit 203 performs the first document reception processing as first received data input processing (step S301). Details of the first document reception processing (step S301) will be described later with reference to FIG. 7. Then, the bookbinding mode input unit 204 accepts input of a bookbinding mode selected by the operator via the UI unit 202, and registers the accepted bookbinding mode in the storage unit such as the HDD 140 or memory 136 (step S302). The job generation control unit 201 determines the bookbinding mode input via the bookbinding mode input unit 204 for the received data (step S303).

The bookbinding mode will be described in short. The embodiment assumes three bookbinding modes. In the first bookbinding mode, page data of only single received data are laid out on a single sheet of paper in order to create one bound product by one job, details of which will be described later with reference to FIG. 11. In the second bookbinding mode, the same page data of single received data are repetitively laid out on a single sheet of paper in order to simultaneously create a plurality of bound products by one job, details of which will be described later with reference to FIG. 12. In the third bookbinding mode, page data of different received data are laid out on a single sheet of paper in order to simultaneously create a plurality of bound products by one job, details of which will be described later with reference to FIG. 13.

If the job generation control unit 201 determines in step S303 that the selected bookbinding mode is the second bookbinding mode, it determines to copy the first received data by a designated number of copies, and inhibits adding subsequent received data (step S304). The job generation control unit 201 controls the job generation processing unit 207 to generate a second bookbinding mode job (step S305). The job generation processing unit 207 generates a printing job to print and bind image data obtained by repetitively laying out the same page data of the first received data on a single sheet of paper (images 1201 and 1202 shown in FIG. 12). Note that details of the second bookbinding mode job generation processing (step S305) will be described later with reference to FIG. 5.

If the job generation control unit 201 determines in step S303 that the selected bookbinding mode is the third bookbinding mode, it controls the job generation processing unit 207 to generate a third bookbinding mode job in order to simultaneously create a plurality of bound products by one job (step S306). The job generation processing unit 207 generates a printing job to print and bind image data obtained by laying out page data of different received data on a single sheet of paper (images 1301 and 1302 shown in FIG. 13). Note that details of the third bookbinding mode job generation processing (step S306) will be described later.

If the job generation control unit 201 determines in step S303 that the selected bookbinding mode is the first bookbinding mode, it controls the job generation processing unit 207 to generate a first bookbinding mode job in order to create one bound product by one job (step S307). In this case, the job generation processing unit 207 generates a printing job to print and bind image data obtained by laying out page data of only the first received data on a single sheet of paper (images 1101 and 1102 shown in FIG. 11). Note that details of the first bookbinding mode job generation processing (step S307) will be described later with reference to FIG. 4.

After the end of each bookbinding mode processing (step S305, S306, or S307), the job output processing unit 208 outputs, as a job, imposed image data and processing instructions to the MFP and near-line finisher (step S308). The processing sequence then ends.

(First Document Reception Processing)

Figure 3:
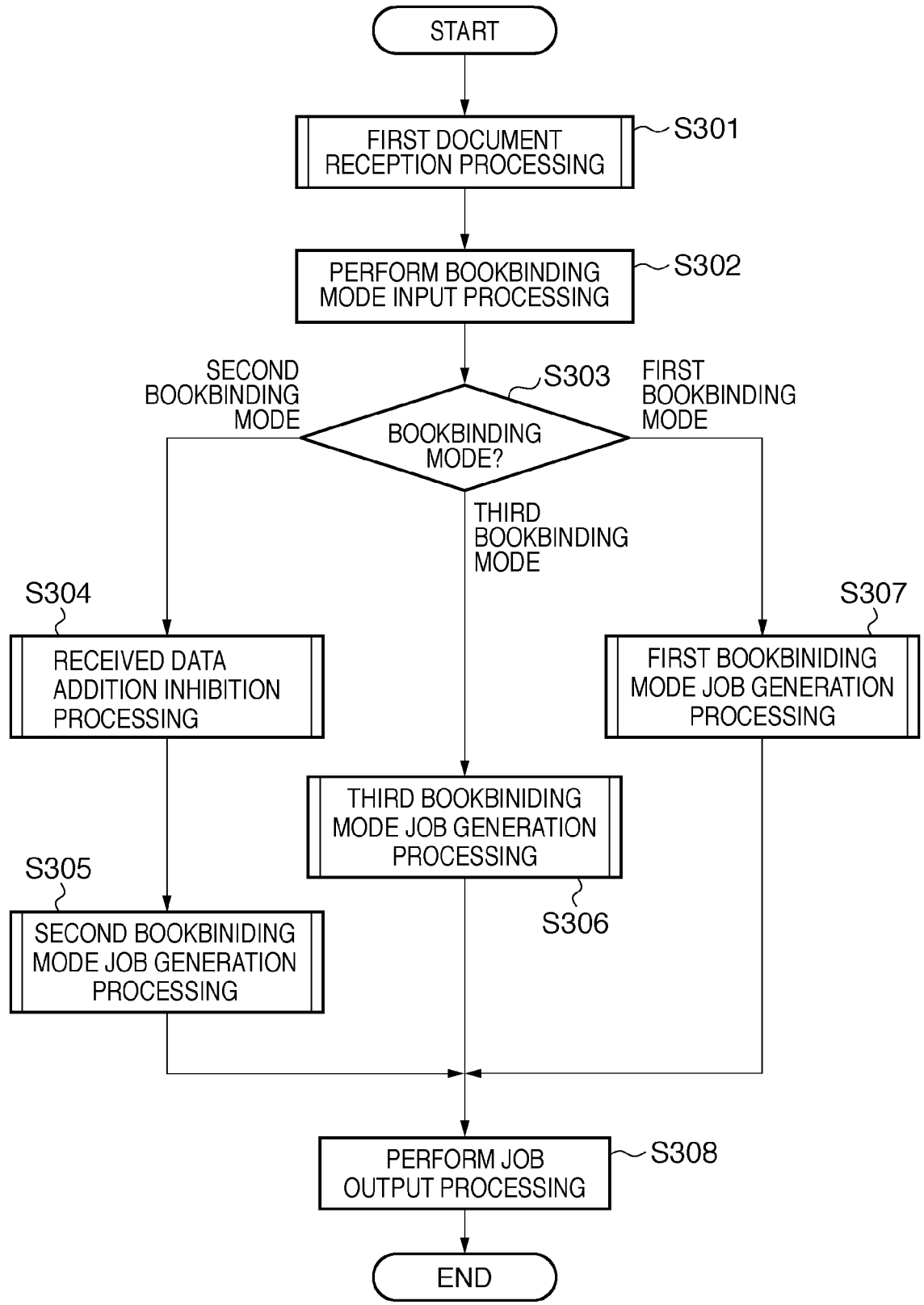
FIG. 3 is an overall flowchart according to the first embodiment.
Figure 7:
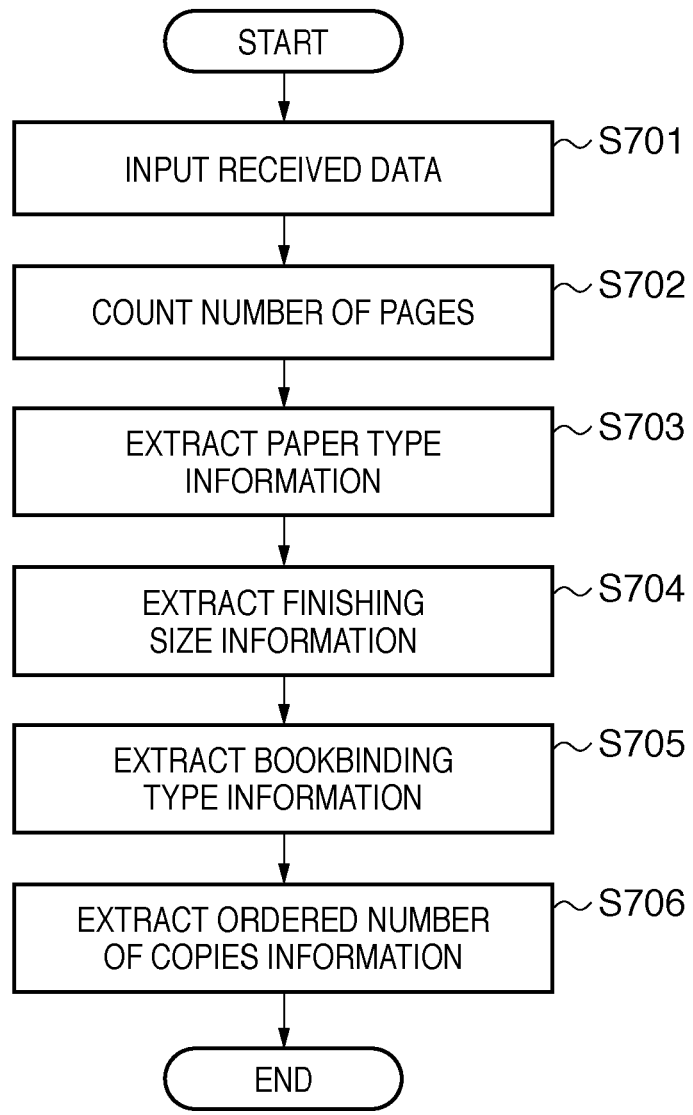
FIG. 7 is a flowchart of first document reception processing according to the first embodiment.

Details of the first document reception processing in step S301 of FIG. 3 are shown in the flowchart of FIG. 7. The document reception processing unit 203 loads, onto the memory 136, received data selected based on a selection instruction from the operator (step S701). The received data is made up of the following elements. Note that the following structure is merely an example and may include another element in accordance with the functions of the printing & bookbinding job generation apparatus 101.

original document data obtained by laying out photographic images and the like on a page of a predetermined size
printing order data The printing order data contained in the received data has at least the following pieces of information:
finishing size
paper type
bookbinding type
number of copies Subsequently, the document reception processing unit 203 counts the number of pages from original document data contained in the received data, and registers it in the storage unit such as the HDD 140 or memory 136 (step S702). The document reception processing unit 203 extracts paper type information from the printing order data, and registers it in the storage unit such as the HDD 140 or memory 136 (step S703). The document reception processing unit 203 extracts finishing size information from the printing order data, and registers it in the storage unit such as the HDD 140 or memory 136 (step S704). The document reception processing unit 203 extracts bookbinding type information from the printing order data, and registers it in the storage unit such as the HDD 140 or memory 136 (step S705). The document reception processing unit 203 extracts number of copies information from the printing order data, and registers it in the storage unit such as the HDD 140 or memory 136 (step S706). Then, the processing sequence ends.

(Bookbinding Mode)

Figure 11:
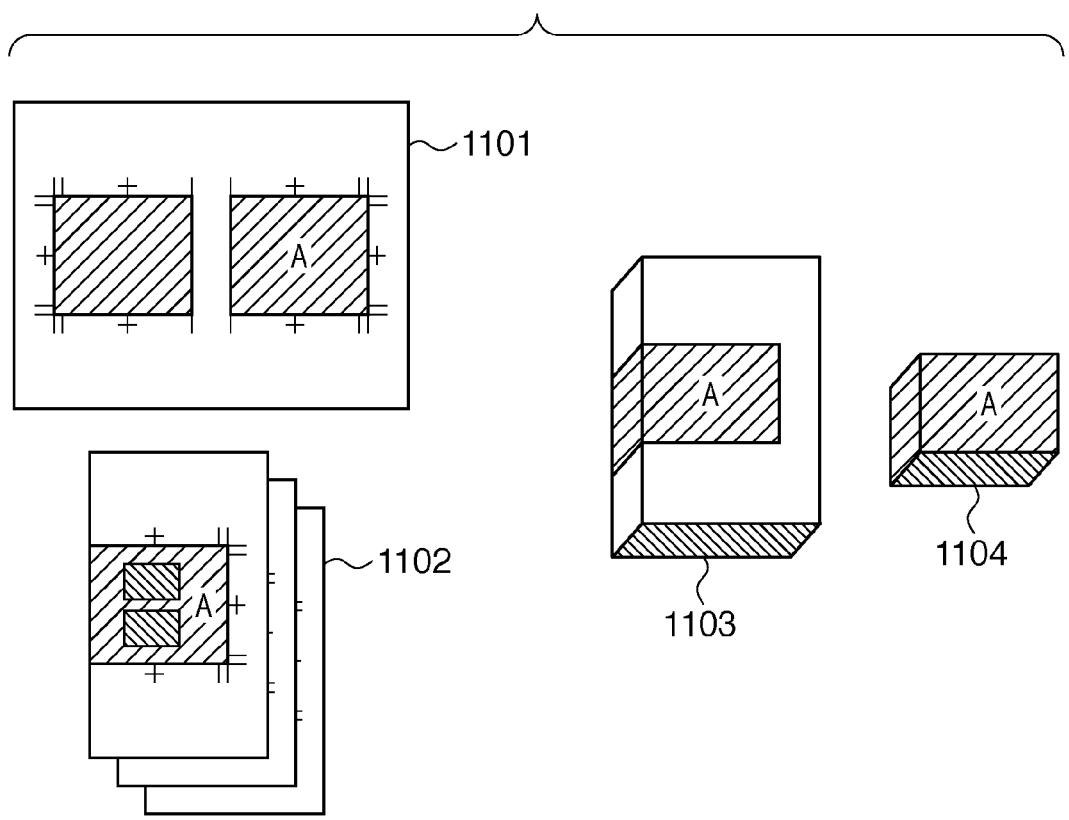
FIG. 11 is a schematic view showing the process of bookbinding in the first bookbinding mode according to the first embodiment.

The bookbinding mode according to the present invention will be explained with reference to FIGS. 11 to 13. The first embodiment defines three bookbinding modes. In the first bookbinding mode, page data of only single received data are laid out on a single sheet of paper in order to create one bound product by one job. FIG. 11 is a conceptual view of the first bookbinding mode. The image 1101 represents page data laid out on a single sheet of paper. The page data are those of two pages for one bound product. Right and left images on the image 1101 are printed as different pages. The image 1102 represents that a plurality of pages are superposed using each page data represented by the image 1101 as one page. An image 1103 represents a state before cutting out paper after superposing the pages represented by the image 1102. An image 1104 represents a state in which the page data part represented by the image 1103 is cut out, extracted, and bound. In this case, one bound product A is created.

In the second bookbinding mode, the same page data of single received data are repetitively laid out on a single sheet of paper in order to simultaneously create a plurality of bound products with the same contents by one job. FIG. 12 is a conceptual view of the second bookbinding mode. The image 1201 represents page data laid out on a single sheet of paper. The page data are those of two pages for two identical bound products. Upper and lower images on the image 1201 represent the same page for different bound products, and right and left images represent different pages for the same bound product. The image 1202 represents that a plurality of pages are superposed using the upper and lower page data represented by the image 1201 as one page. An image 1203 represents a state before cutting out paper after superposing the pages represented by the image 1202. An image 1204 represents a state in which the outer frame of the page data represented by the image 1203 is cut out to extract the page data part. An image 1205 represents a state in which the image 1204 is further cut out for each bound product to bind the cutout. In this case, two identical bound products A are created.

In the third bookbinding mode, page data of different received data are laid out on a single sheet of paper in order to simultaneously create a plurality of bound products with different contents by one job. FIG. 13 is a conceptual view of the third bookbinding mode. The image 1301 represents page data laid out on a single sheet of paper. The page data are those of two pages for two different bound products. Upper and lower images on the image 1301 represent pages with the same page number for different bound products, and right and left images represent different pages for the same bound product. The image 1302 represents that a plurality of pages are superposed using the upper and lower page data represented by the image 1301 as one page. An image 1303 represents a state before cutting out paper after superposing the pages represented by the image 1302. An image 1304 represents a state in which the outer frame of the page data represented by the image 1303 is cut out to extract the page data part. An image 1305 represents a state in which the image 1304 is further cut out for each bound product to bind the cutout. In this case, two different bound products A and B are created.

(Job Generation Processing: First Bookbinding Mode)

Figure 4:
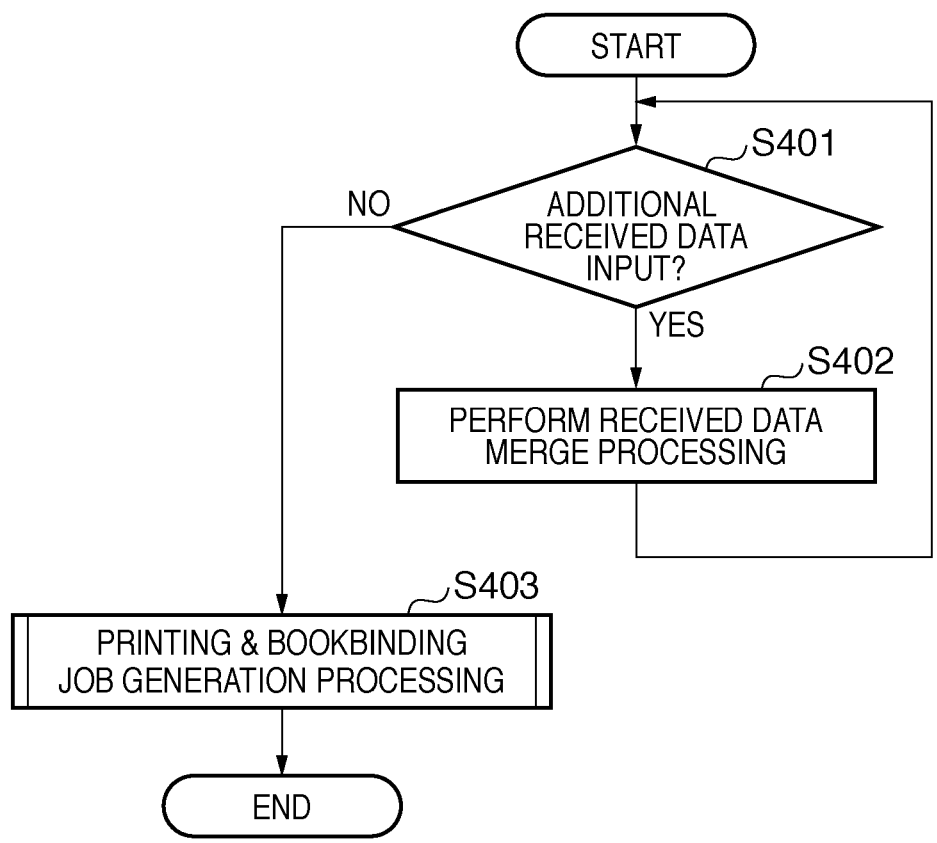
FIG. 4 is a flowchart of first bookbinding mode job generation processing according to the first embodiment.

Details of the first bookbinding mode job generation processing in step S307 of FIG. 3 are shown in the flowchart of FIG. 4. When the processing starts, the job generation control unit 201 determines whether additional received data has been input (step S401). If additional received data has been input (YES in step S401), the job generation control unit 201 performs processing of merging new additional received data into received data which has already been input (step S402). If a plurality of new additional received data exist, this processing is repeated until all the additional received data are merged. As a result, a plurality of received data are merged into single received data, and subsequent job generation is done.

If no additional received data has been input (NO in step S401), the job generation control unit 201 executes printing & bookbinding job generation processing (step S403). The printing & bookbinding job generation processing will be described later with reference to FIG. 8. After the end of the printing & bookbinding job generation processing, the processing sequence ends.

(Job Generation Processing: Second Bookbinding Mode)

Figure 5:
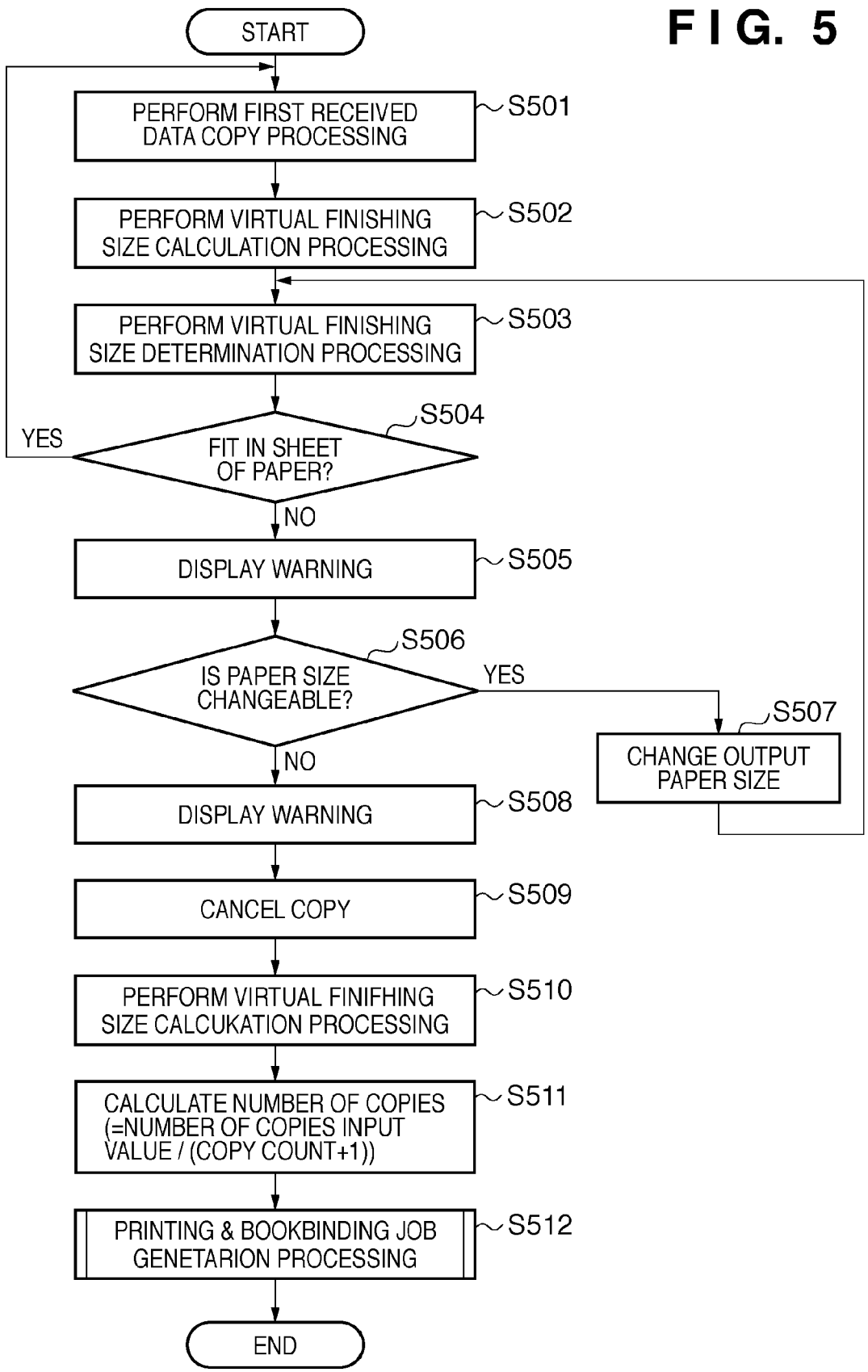
FIG. 5 is a flowchart of second bookbinding mode job generation processing according to the first embodiment.

Details of the second bookbinding mode job generation processing in step S305 of FIG. 3 are shown in the flowchart of FIG. 5. When the processing starts, the job generation control unit 201 performs the first received data copy processing (step S501). Then, the virtual finishing size determination processing unit 206 calculates, based on the following equations, virtual finishing sizes assuming that pages of the first received data and its copy data are laid out side by side (step S502). FIG. 12 exemplifies parameters used in the respective equations.

Interval between top and tail edges on virtual bound product=virtual finishing height Virtual finishing height Hs=height Hl of page of first received data×2+margin Hd for cutout Interval between edge and gutter on virtual bound product=virtual finishing width Virtual finishing width Ws=width Wl of page of first received data+margin Wd for cutout Interval between top and tail edges on virtual bound product=virtual finishing height Hs (1206)

Height Hl of page of first received data (1207)

Margin Hd for cutout (1208)

Width Wl of page of first received data (1209)

Paper size height Hp (1210)

Paper size width Wp (1211)

Margin Wd for cutout (1212)

The virtual finishing size determination processing unit 206 determines whether the calculated virtual finishing sizes fit in the paper size for use (step S503).

If the paper size height Hp≧the virtual finishing height Hs, and the paper size width Wp≧the virtual finishing width Ws, the virtual finishing size determination processing unit 206 determines that the calculated virtual finishing sizes fit in the paper size for use. If the virtual finishing size determination processing unit 206 determines in step S503 that the calculated virtual finishing sizes fit in the paper size for use (YES in step S504), the job generation control unit 201 returns to step S501 to repeat the first received data copy processing. Image data generated from a plurality of received data are laid out on a single sheet of paper as long as they are permitted to be contained in the paper size selected at that time.

If the virtual finishing size determination processing unit 206 determines in step S503 that the calculated virtual finishing sizes do not fit in the paper size for use (NO in step S504), the job generation control unit 201 displays, on the UI unit 202, a warning that no more copy of the first received data can fit in the sheet of paper (step S505). Then, the job generation control unit 201 acquires printer information, and determines whether the paper size for use is changeable, depending on whether paper of the same type with a different size has been fed (step S506). This printer information is information containing the paper supply state, job status, and the like in the printing & bookbinding job generation apparatus 101. In the embodiment, the printer information has at least information about the paper size processable by the apparatus and the paper feed state. If the job generation control unit 201 determines in step S506 that the paper size is changeable (YES in step S506), it changes the output paper size (step S507). The job generation control unit 201 then returns to virtual finishing size determination processing (step S503). If the job generation control unit 201 determines that the paper size is unchangeable (NO in step S506), it displays again, on the UI unit 202, a warning that there is no changeable paper size (step S508).

The job generation control unit 201 cancels the finally copied data (step S509). The virtual finishing size determination processing unit 206 calculates again virtual finishing sizes assuming that pages of the first received data and copied data except for the canceled data are laid out side by side (step S510).

The job generation control unit 201 calculates the number of copies based on the following equation when printing and binding image data obtained by laying out the same page data of the first received data and its copy data on a single sheet of paper (step S511):

Number of copies=ordered number of copies/(copy count+1)

(the decimal part is rounded up)

If the number of copies is one, this indicates that bound products can be simultaneously created by (copy count+1).

After that, the job generation processing unit 207 generates a printing & bookbinding job containing image data for printing, a printing instruction, and a bookbinding instruction (step S512). The printing & bookbinding job generation processing will be described later with reference to FIG. 8. After the printing & bookbinding job generation processing, the processing sequence ends.

(Job Generation Processing: Third Bookbinding Mode)

Figure 6:
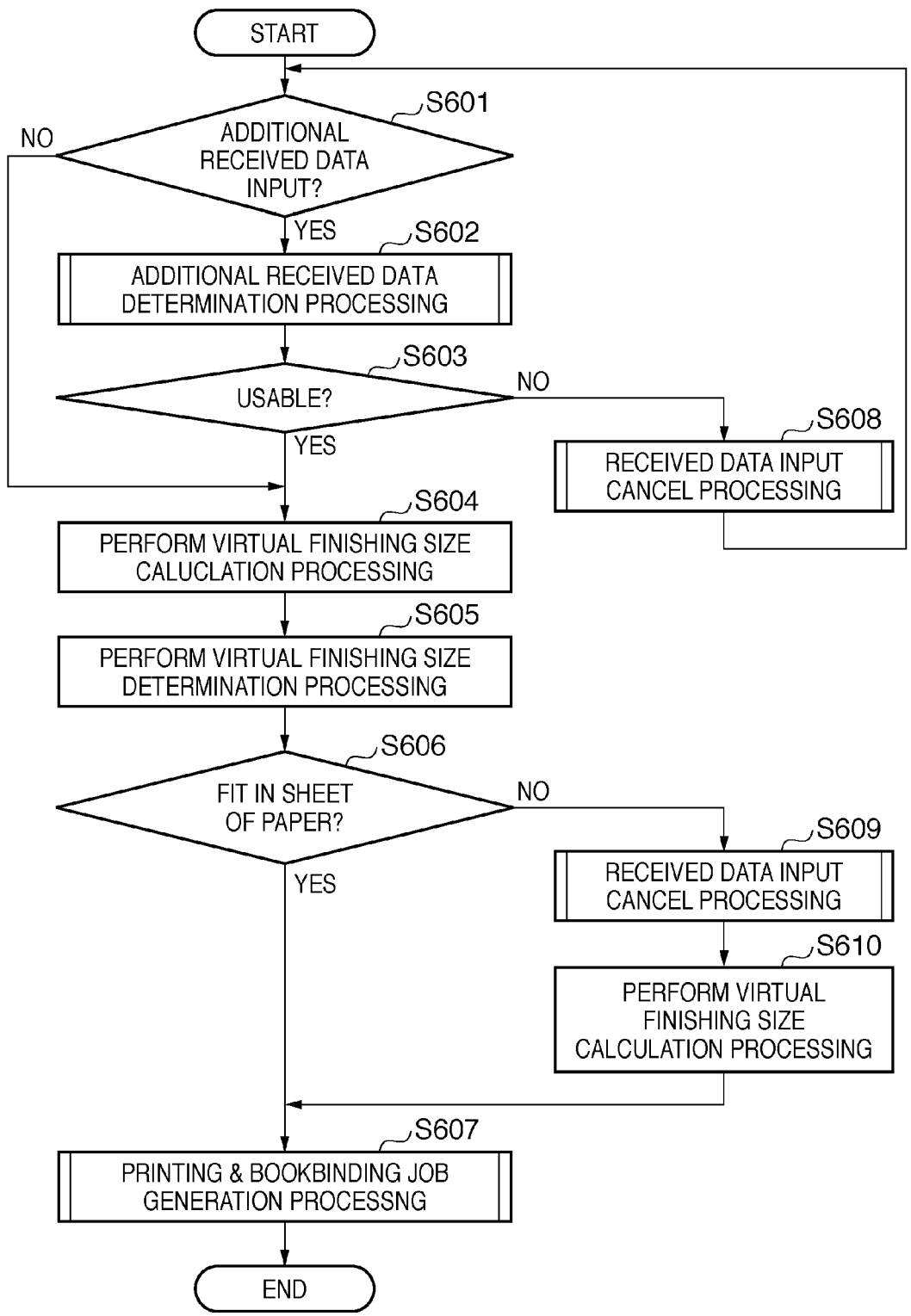
FIG. 6 is a flowchart of third bookbinding mode job generation processing according to the first embodiment.

Details of the third bookbinding mode job generation processing in step S306 of FIG. 3 are shown in the flowchart of FIG. 6. When the processing starts, the job generation control unit 201 determines whether the second or third received data (additional received data) has been input (step S601). If the additional received data has been input (YES in step S601), the job generation control unit 201 controls the additional received data determination processing unit 205 to determine whether the additional received data is usable, in order to handle the additional received data as data forming a book different from that of received data which has already been input. That is, the additional received data determination processing unit 205 performs determination processing to determine whether the additional received data can be used to print and bind the additional received data on a single sheet of paper as that of the first received data (step S602). Details of the additional received data determination processing will be described later with reference to FIG. 10.

If it is determined in additional received data determination processing of step S602 that the additional received data is unusable (NO in step S603), the job generation control unit 201 cancels input of the additional received data (step S608). Note that details of the additional received data input cancel processing will be described later with reference to FIG. 9.

If it is determined in additional received data determination processing of step S602 that the additional received data is usable (YES in step S603) or if it is determined in step S601 that no additional received data has been input (NO in step S601), the virtual finishing size determination processing unit 206 calculates, based on the following equations, virtual finishing sizes assuming that pages of the first received data and additional received data are laid out side by side (step S604). FIG. 13 exemplifies parameters used in the respective equations.

Virtual finishing height Hs=height Hl of page of first received data+height Ha of page of additional received data+ margin Hd for cutout Interval between edge and gutter on virtual bound product=virtual finishing width Virtual finishing width Ws=(larger one of width Wl of page of first received data and width Wa of page of additional received data)

Interval between top and tail edges on virtual bound product=virtual finishing height Hs (1306)

Height Hl of page of first received data (1307)
Margin Hd for cutout (1308)
Height Ha of page of additional received data (1309)
Width Wl of page of first received data (1310)
Width Wa of page of additional received data (1311)
Paper size height Hp (1312)
Paper size width Wp (1313)

The virtual finishing size determination processing unit 206 determines whether the calculated virtual finishing sizes fit in the paper size for use (step S605).

If the paper size height Hp≧the virtual finishing height Hs, and the paper size width Wp≧the virtual finishing width Ws, the virtual finishing size determination processing unit 206 determines that the calculated virtual finishing sizes fit in the paper size for use. If the virtual finishing size determination processing unit 206 determines in step S605 that the calculated virtual finishing sizes do not fit in the paper size for use (NO in step S606), the job generation control unit 201 cancels input of the additional received data (step S609). Note that details of the additional received data input cancel processing will be described with reference to FIG. 9. Then, the virtual finishing size determination processing unit 206 sets, as virtual finishing size information, the first received data finishing size information registered in the storage unit such as the HDD 140 or memory 136 (step S610).

If the virtual finishing size determination processing unit 206 determines in step S605 that the calculated virtual finishing sizes fit in the paper size for use (YES in step S606) or if the processing in step S610 ends, the job generation processing unit 207 generates a printing & bookbinding job containing image data to be printed, a printing instruction, and a bookbinding instruction (step S607). Note that details of the printing & bookbinding job generation processing in step S607 will be described later with reference to FIG. 8. The processing sequence then ends.

(Additional Received Data Determination Processing)

Figure 10:
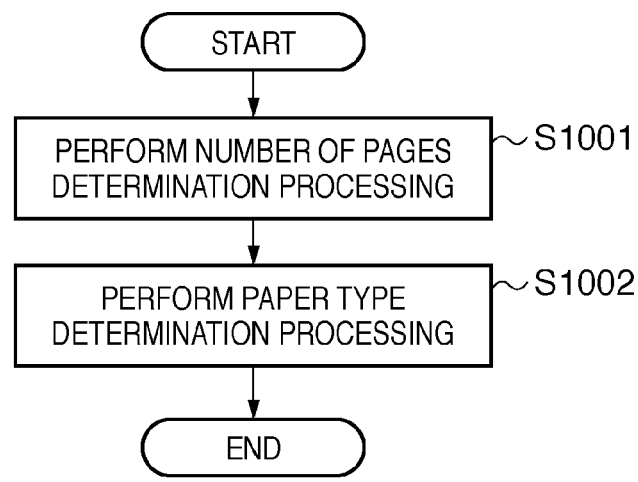
FIG. 10 is a flowchart of additional received data determination processing according to the first embodiment.

Details of the additional received data determination processing in step S602 of FIG. 6 are shown in the flowchart of FIG. 10. When the processing starts, the additional received data determination processing unit 205 performs number of pages determination processing to determine whether additional received data is equal in the number of pages to the first received data (step S1001). If the additional received data is different in the number of pages from the first received data, a blank page will be generated upon bookbinding. Thus, the additional received data determination processing unit 205 determines that the additional received data cannot be used to print and bind it on a single sheet of paper as that of the first received data. The determination result information is then held.

The additional received data determination processing unit 205 performs paper type determination processing to determine whether the paper type of printing order data in the additional received data is identical to paper type information of the printing order of the first received data (step S1002). If the paper type of printing order data in the additional received data is different from paper type information of the printing order of the first received data, printing and bookbinding will be executed using paper different from the ordered one. Thus, the additional received data determination processing unit 205 determines that the additional received data cannot be used to print and bind it on a single sheet of paper as that of the first received data. The determination result information is then held. The processing sequence then ends.

(Printing & Bookbinding Job Generation Processing)

Figure 8:
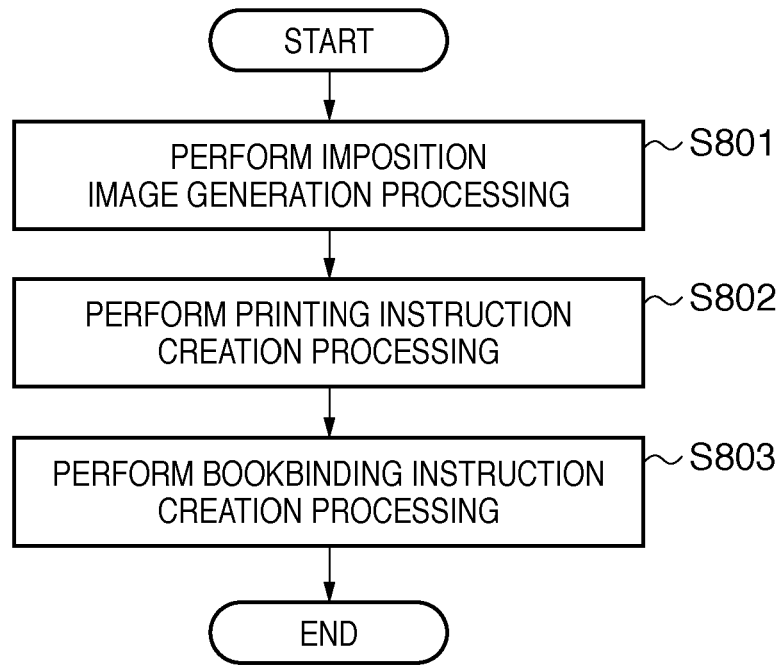
FIG. 8 is a flowchart of printing & bookbinding job generation processing according to the first embodiment.

Details of the printing & bookbinding job generation processing in step S403 of FIG. 4, step S512 of FIG. 5, and step S607 of FIG. 6 are shown in the flowchart of FIG. 8. When the processing starts, the job generation processing unit 207 generates an imposition image as image data for printing in correspondence with received data to be processed as a single job (step S801).

In the first bookbinding mode, only the first received data is laid out on paper (FIG. 11).

In the second bookbinding mode, image data of the first received data and copy data in the same order are laid out and imposed on a single sheet of paper (FIG. 12). More specifically, image data is generated by laying out image data corresponding to the first received data and copy data in the same order side by side in a region assuming a single sheet of paper based on the virtual finishing sizes calculated in step S510 of FIG. 5.

In the third bookbinding mode, image data of the first received data and additional received data in the same order are laid out and imposed on a single sheet of paper (FIG. 13). More specifically, image data is generated by laying out image data corresponding to the first received data and additional received data in the same order side by side in a region assuming a single sheet of paper based on the virtual finishing sizes calculated in step S604 of FIG. 6.

Then, the job generation processing unit 207 generates a printing instruction using number of copies information, bookbinding type information, and paper type information of printing order data registered in the storage unit such as the HDD 140 or memory 136 (step S802). In the second and third bookbinding modes, the job generation processing unit 207 generates a printing instruction further using the virtual finishing sizes calculated in step S510 or S605. Similarly, the job generation processing unit 207 generates a bookbinding instruction by calculating the stitching position, folding position, cutout position, and the like as information necessary for bookbinding based on the bookbinding type information, virtual finishing size information, paper type information, and the like (step S803). The processing sequence then ends.

(Input Cancel Processing)

Figure 9:
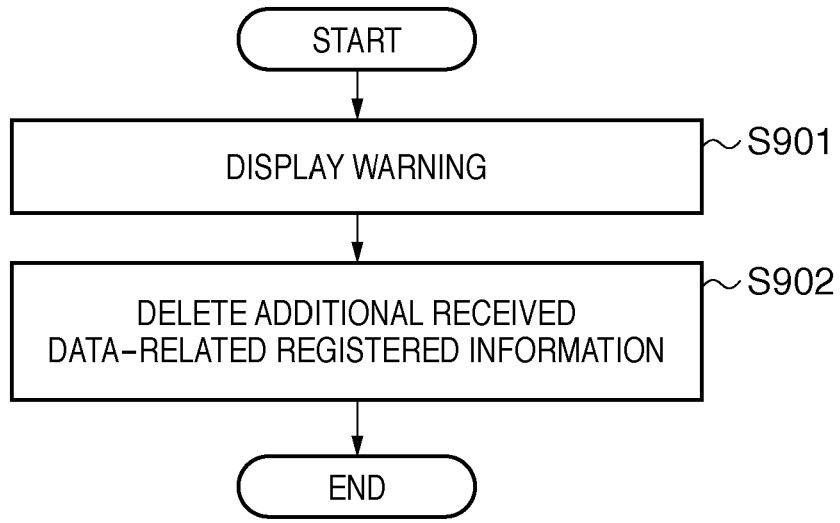
FIG. 9 is a flowchart of additional received data input cancel processing according to the first embodiment.

Details of the additional received data input cancel processing in steps S608 and S609 of FIG. 6 are shown in the flowchart of FIG. 9. When the processing starts, the job generation control unit 201 displays a warning via the UI unit 202 (step S901). When this processing is executed as that of step S608, the job generation control unit 201 displays a warning that, for example, input additional received data cannot be bound together with the first received data. When this processing is executed as that of step S609, the job generation control unit 201 displays a warning that, for example, input additional received data to be bound with the first received data does not fit in the paper size.

After that, the job generation control unit 201 cancels the input additional received data (step S902). When this processing is executed as that of step S608, input of new additional received data is allowed. When this processing is executed as that of step S609, execution of bookbinding of only the first received data is set.

By the above processing, even when pages of a plurality of received data are laid out side by side on a single sheet of paper, the embodiment can reduce problems such as a mismatch between designated paper types and a mismatch in the number of pages between booklets. A product the user wants can be reliably created.

A printing job to finish a plurality of booklets by laying out pages on a single sheet of paper using a plurality of received data can be easily generated even for orders each for only one booklet. This reduces waste of paper and increase the work efficiency.

Second Embodiment

In the first embodiment, additional received data determination processing (step S602) is executed when the operator inputs additional received data in the third bookbinding mode job generation processing shown in FIG. 6. However, if it is determined in the additional received data determination processing that additional received data is unusable, the operator cumbersomely has to select additional received data again from a plurality of received data.

Figure 14:
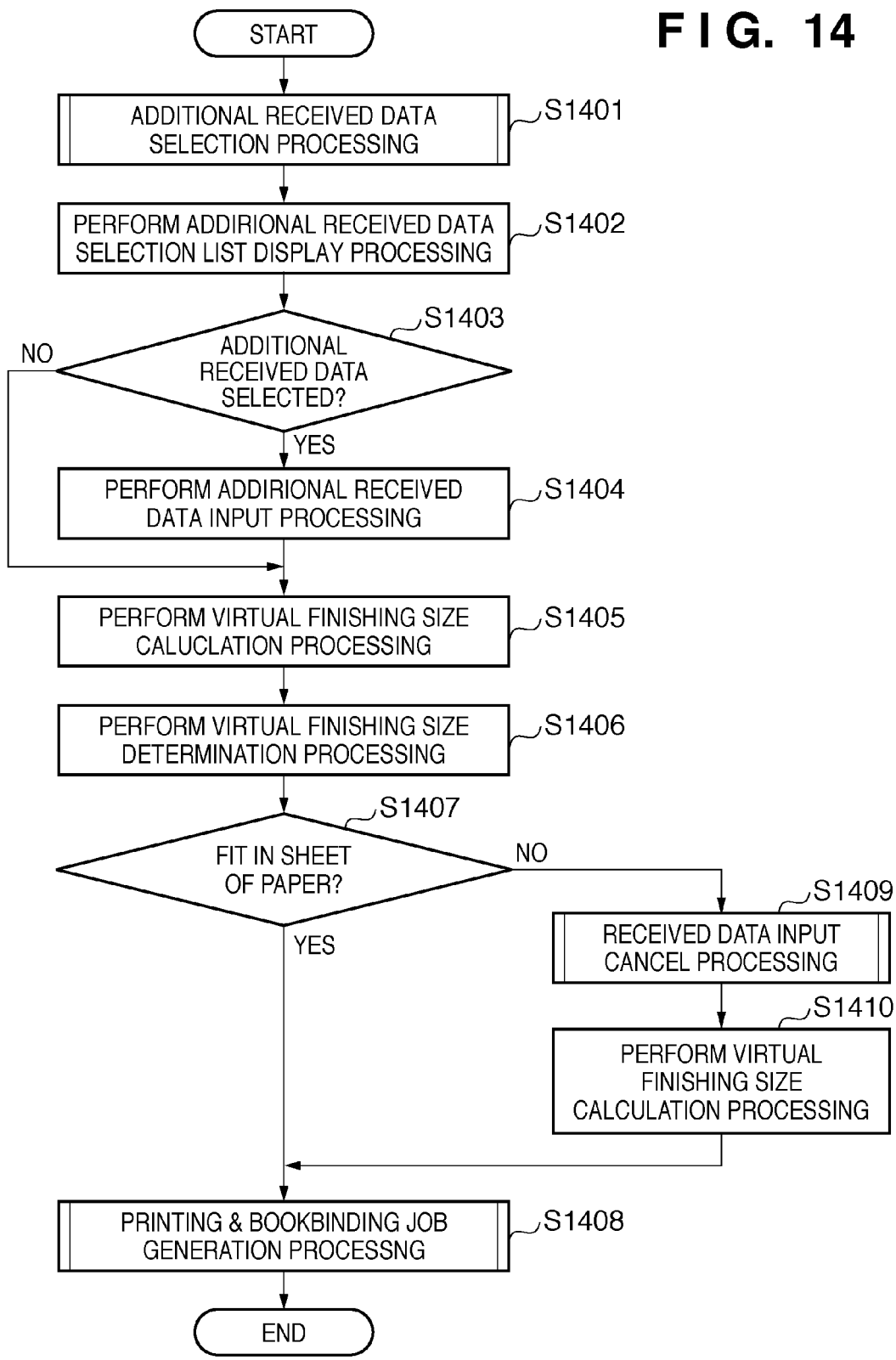
FIG. 14 is a flowchart of third bookbinding mode job generation processing according to the second embodiment.
Figure 15:
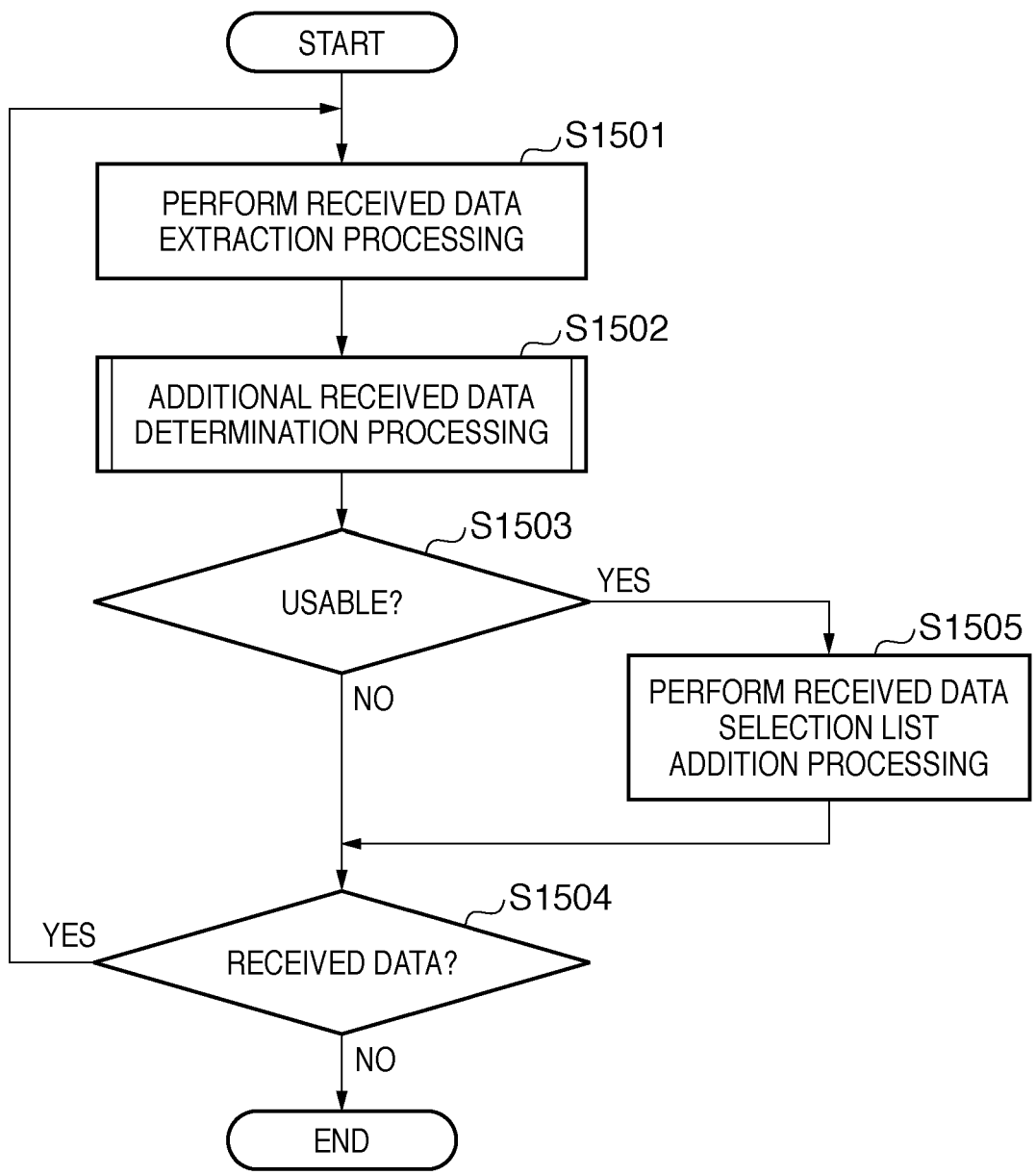
FIG. 15 is a flowchart of additional received data selection processing according to the second embodiment.

According to the second embodiment, additional received data candidates are automatically selected and displayed using the first received data as a reference in third bookbinding mode job generation processing (step S306). Third bookbinding mode job generation processing (step S306) according to the second embodiment is shown in the flowcharts of FIGS. 14 and 15. Note that the program of this sequence by a printing & bookbinding job generation apparatus 101 is executed by a CPU 135 after the sequence shown in the flowchart is stored in any storage unit such as a RAM, ROM, or HDD.

(Job Generation Processing: Third Bookbinding Mode)

A job generation control unit 201 selects a candidate to be processed as additional received data from received data stored as orders from users (step S1401).

Details of the additional received data selection processing in step S1401 are shown in the flowchart of FIG. 15. The job generation control unit 201 extracts stored received data one by one (step S1501), and controls an additional received data determination processing unit 205 to determine, using the first received data as a reference, whether the additional received data is usable (step S1502). The additional received data determination processing in step S1502 is the same as the processing described with reference to FIG. 10 in the first embodiment.

If the additional received data determination processing unit 205 determines in step S1502 that the additional received data is usable (YES in step S1503), the job generation control unit 201 adds the additional received data to the received data selection list (step S1505). The job generation control unit 201 then advances to step S1504. If the additional received data determination processing unit 205 determines in step S1502 that the additional received data is unusable (NO in step S1503), the job generation control unit 201 advances to step S1504 without adding the additional received data to the received data selection list.

If received data stored as an order from a user still remains (YES in step S1504), the job generation control unit 201 returns to step S1501 to repeat the processing. If no stored received data remains (NO in step S1504), the job generation control unit 201 returns to the processing in FIG. 14.

After the end of the additional received data selection processing (step S1401) shown in FIG. 15, the job generation control unit 201 displays the additional received data selection list via a UI unit 202 (step S1402). If the operator has selected additional received data from the represented additional received data selection list (YES in step S1403), the job generation control unit 201 receives it as additional received data (step S1404). If the operator has not selected additional received data (NO in step S1403), the job generation control unit 201 directly advances to step S1405. Processes in step S1405 and subsequent steps are the same as those in step S604 and subsequent steps of FIG. 6 in the first embodiment, and a description thereof will not be repeated.

By the above processing, additional received data candidates are automatically selected and displayed. In addition to the effects of the first embodiment, the second embodiment can omit a cumbersome operation to, for example, make a selection again because received data selected by the operator is not determined to be unusable.

Third Embodiment

In the first and second embodiments, virtual finishing size determination processing is executed based on a paper size selected in advance by the operator in the third bookbinding mode job generation processing (steps S606 and S1406: FIGS. 6 and 14). When a plurality of input received data do not fit in the paper size selected at the beginning after inputting additional received data, input of the additional received data is canceled. The operator needs to select an appropriate paper size at the beginning so that a plurality of input received data fit in the paper size.

Figure 16:
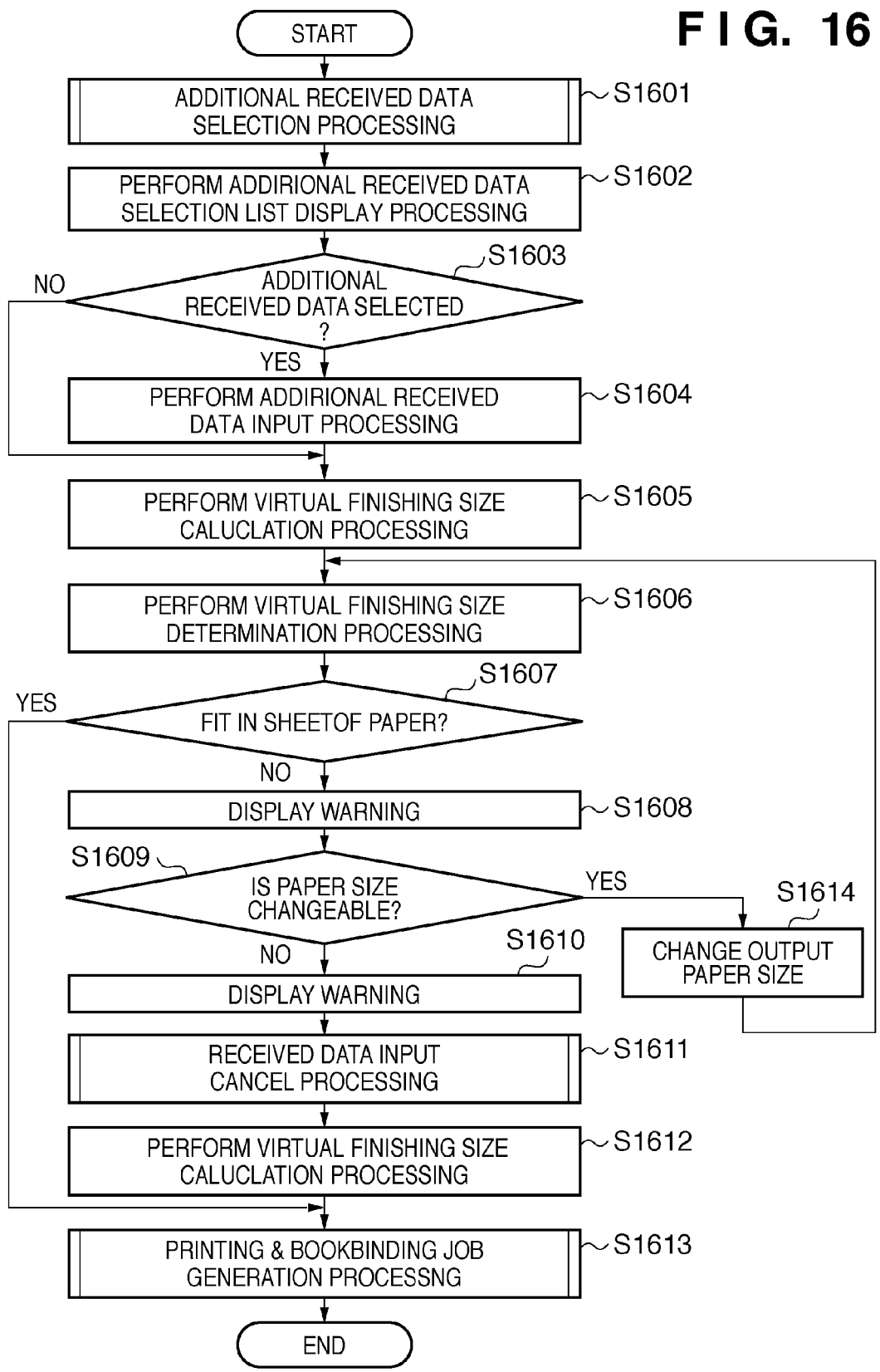
FIG. 16 is a flowchart of third bookbinding mode job generation processing according to the third embodiment.

In the third embodiment, the paper size is automatically selected upon inputting additional received data in third bookbinding mode job generation processing. Third bookbinding mode job generation processing according to the third embodiment is shown in the flowchart of FIG. 16. Note that the program of this sequence by a printing & bookbinding job generation apparatus 101 is executed by a CPU 135 after the sequence shown in the flowchart is stored in any storage unit such as a RAM, ROM, or HDD and then read out. Processes in steps S1601 to S1606 of FIG. 16 are the same as those in steps S1401 to S1406 of FIG. 14 in the second embodiment, and a description thereof will not be repeated.

If it is determined in step S1606 that the virtual finishing sizes do not fit in the paper size for use (NO in step S1607), a job generation control unit 201 displays, via a UI unit 202, a warning that no more additional received data can fit in the sheet of paper (step S1608). Then, the job generation control unit 201 acquires printer information, and determines whether the paper size for use is changeable, depending on whether paper of the same type with a different size has been fed (step S1609). This printer information is information containing the paper supply state, job status, and the like in the printing & bookbinding job generation apparatus 101. In the embodiment, the printer information has at least information about the paper size processable by the apparatus and the paper feed state.

If the job generation control unit 201 determines in step S1609 that the paper size is changeable (YES in step S1609), it changes the output paper size (step S1614). The job generation control unit 201 then returns to virtual finishing size determination processing (step S1606) to repeat the processing. If the job generation control unit 201 determines in step S1609 that the paper size is unchangeable (NO in step S1609), it displays again, via the UI unit 202, a warning that there is no changeable paper size (step S1610).

The job generation control unit 201 cancels input of additional received data (step S1611). The received data input cancel processing is the same as the processing described in the first embodiment with reference to FIG. 9, and a description thereof will not be repeated. A virtual finishing size determination processing unit 206 calculates again virtual finishing sizes assuming that only pages of the first received data are laid out (step S1612). Equations for calculation used here are the same as those used in the first and second embodiments.

A job generation processing unit 207 generates a printing & bookbinding job containing image data for printing, a printing instruction, and a bookbinding instruction using the virtual finishing sizes calculated in step S1612 (step S1613). The printing & bookbinding job generation processing is the same as the processing described in the first embodiment with reference to FIG. 8, and a description thereof will not be repeated. If it is determined in step S1606 that the virtual finishing sizes fit in the paper size for use (YES in step S1607), the job generation processing unit 207 generates a printing & bookbinding job using the virtual finishing sizes calculated in step S1605.

By the above processing, when a plurality of input received data do not fit in a paper size selected at the beginning, an alternative paper size is automatically selected again. In addition to the effects of the first embodiment, the third embodiment can omit a cumbersome operation to select an appropriate paper size by the operator at the beginning and a cumbersome operation to, for example, make a selection again.

Fourth Embodiment

In the first embodiment, the job generation processing unit 207 generates a single bookbinding instruction (step S803 of FIG. 8). However, an apparatus assuming bookbinding of an individual booklet, like an MFP, cannot process a complicated job to simultaneously generate a plurality of bound products by one job, like a second bookbinding mode job and third bookbinding mode job. If an apparatus such as an MFP is selected as a printing apparatus, bookbinding may end midway (an image 1204 in FIG. 12 or an image 1304 in FIG. 13).

In the fourth embodiment, for a second bookbinding mode job or third bookbinding mode job in printing & bookbinding job generation processing (step S512 or S607), a paper bundle containing information about a plurality of bound products to be created as different bound products is tentatively regarded as one containing one bound product in the MFP. The MFP performs processing of generating a first bookbinding instruction to stitch the paper bundle, and processing of generating a second bookbinding instruction to finish a part remaining in the first bookbinding instruction by a near-line finisher. In the first embodiment, only a bookbinding instruction to the MFP is created. To the contrary, in the fourth embodiment, bookbinding instructions are generated separately as a first bookbinding instruction to the MFP and a second bookbinding instruction to the near-line finisher, and transmitted to the respective apparatuses.

Figure 17:
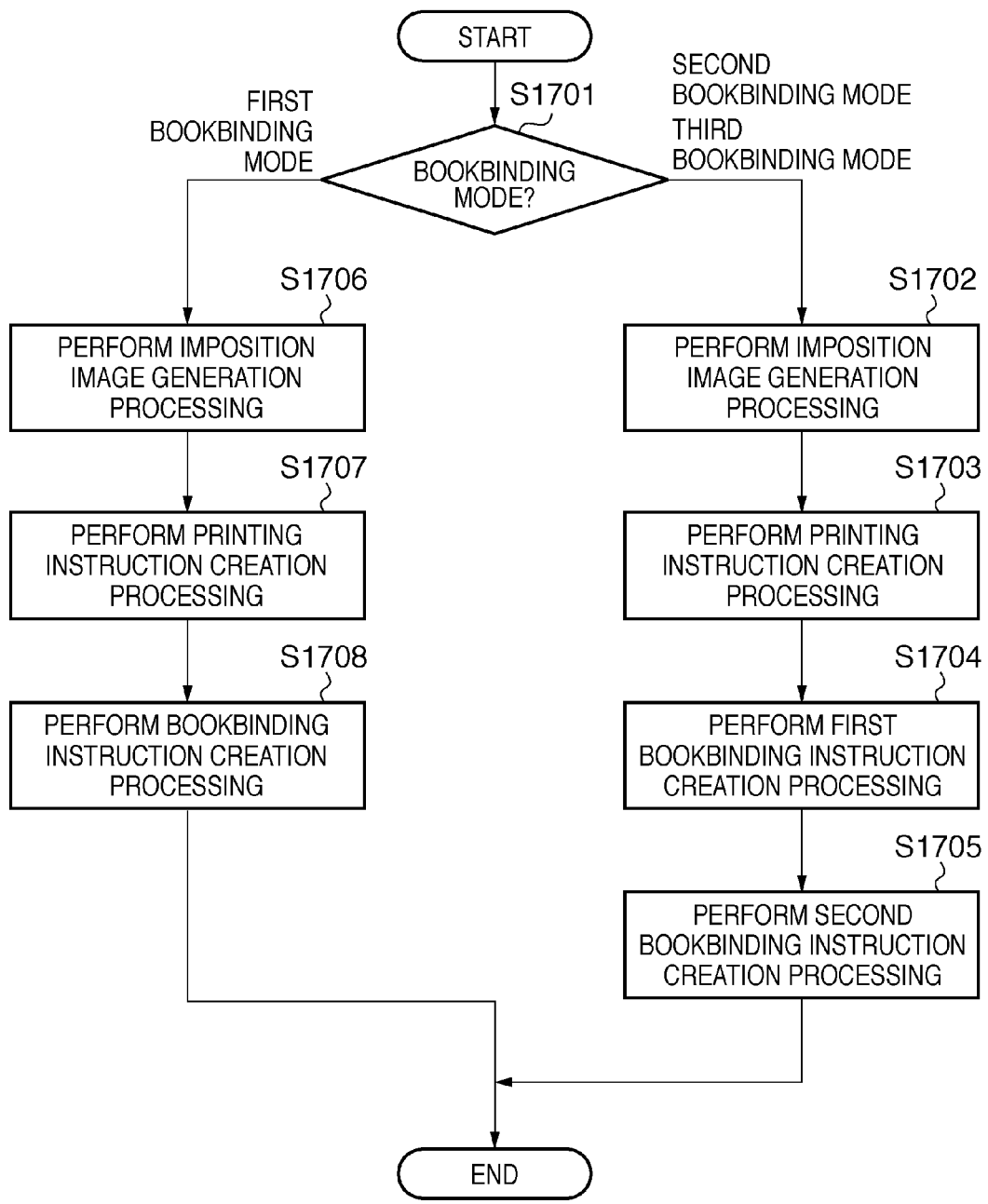
FIG. 17 is a flowchart of printing & bookbinding job generation processing according to the fourth embodiment.

Details of printing & bookbinding job generation processing (step S512 or S607) according to the fourth embodiment are shown in the flowchart of FIG. 17. Note that the program of this sequence by a printing & bookbinding job generation apparatus 101 is executed by a CPU 135 after the sequence shown in the flowchart is stored in any storage unit such as a RAM, ROM, or HDD and then read out. Processes in steps S1706 to S1708 of FIG. 17 are the same as those in steps S801 to S803 of FIG. 8 in the first embodiment, and a description thereof will not be repeated.

When the processing starts, a bookbinding mode is determined (step S1701). If the bookbinding mode is the first bookbinding mode, the process advances to step S1706 to perform the same processing as that described in the first embodiment (steps S1706 to S1708). If the bookbinding mode is the second or third bookbinding mode, the process advances to step S1702.

A job generation processing unit 207 generates an imposition image for image data to be printed (step S1702). In the second bookbinding mode, page data of the first received data and copy data in the same order are laid out and imposed on a single sheet of paper, as shown in FIG. 12. More specifically, image data is generated by laying out page data of the first received data and copy data in the same order side by side in a region assuming a single sheet of paper based on the virtual finishing sizes calculated in step S510. In the third bookbinding mode, page data of the first received data and additional received data in the same order are laid out and imposed on a single sheet of paper, as shown in FIG. 13. More specifically, image data is generated by laying out page data of the first received data and additional received data in the same order side by side in a region assuming a single sheet of paper based on the virtual finishing sizes calculated in step S604.

Then, the job generation processing unit 207 performs printing instruction generation processing (step S1703). The job generation processing unit 207 generates information indicating a printing instruction using number of copies information, bookbinding type information, and paper type information of printing order data registered in the storage unit such as an HDD 140 or memory 136, and information about the virtual finishing sizes calculated in step S510. The job generation processing unit 207 then performs the first bookbinding instruction generation processing (step S1704). At this time, based on the virtual finishing size information and the like, the job generation processing unit 207 generates information indicating a first bookbinding instruction including stitching processing and cutout processing when a plurality of bound products are tentatively regarded as one bound product. After that, the job generation processing unit 207 performs the second bookbinding instruction generation processing (step S1705). At this time, the job generation processing unit 207 generates information indicating a second bookbinding instruction necessary to finish a product generated in accordance with the first bookbinding instruction (state of the image 1204 in FIG. 12 or the image 1304 in FIG. 13) as a bound product by the near-line finisher. The processing sequence then ends.

In step S308, a job output processing unit 208 outputs, as the generated instructions, information about the image data, printing instruction, and first bookbinding instruction to the MFP, and information about the second bookbinding instruction to the near-line finisher.

By the above processing, a bookbinding instruction complying with an apparatus is output even for a complicated job to simultaneously generate a plurality of bound products by one job, like a second bookbinding mode job and third bookbinding mode job. A bound product the user wants can be reliably generated.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-178078, filed Aug. 6, 2010, which is hereby incorporated by reference herein in its entirety.

What is claimed is:

1. An information processing apparatus which generates, from received data, a job containing a plurality of image data to be printed, a printing instruction, and a bookbinding instruction, and outputs the job to a printing apparatus and post-processing apparatus for generating a bound product, comprising:
   a data determination unit configured to determine, using first received data as a reference, whether to add other received data to processing in a single job;
   a size determination unit configured, when said data determination unit determines to add the other received data in a bookbinding mode in which a plurality of bound products are generated by a single job, to regard, as single tentative image data, a plurality of image data which are generated from different received data and laid out on a single sheet of paper, and to determine whether the single tentative image data fits in the single sheet of paper; and
   a job generation unit configured to generate a job for at least one received data corresponding to image data contained in the single tentative image data determined by said size determination unit to fit in the single sheet of paper.

2. The apparatus according to claim 1, wherein in the bookbinding mode in which a plurality of bound products are generated by a single job, said data determination unit includes:
   a number of pages determination unit configured to determine whether the other received data and the first received data are equal in the number of pages, and
   a paper type determination unit configured to determine whether the other received data and the first received data are of the same paper type, and
   wherein when said number of pages determination unit determines that the other received data and the first received data are equal in the number of pages, and said paper type determination unit determines that the other received data and the first received data are of the same paper type, said data determination unit determines to add the other received data to processing in the single job.

3. The apparatus according to claim 1, wherein in a bookbinding mode in which a plurality of bound products with the same content are generated by a single job, said size determination unit regards, as single tentative image data, copies of one of a plurality of image data generated from single received data that are laid out on one sheet of paper, and determines whether the single tentative image data fits in the single sheet of paper.

4. The apparatus according to claim 1, wherein in a bookbinding mode in which a plurality of bound products with different contents are generated by a single job or in a bookbinding mode in which a plurality of bound products with the same content are generated by a single job, said job generation unit includes:
   a first bookbinding instruction generation unit configured to regard, as single tentative image data, a plurality of image data respectively laid out on a plurality of paper sheets, and to generate a first bookbinding instruction to perform stitching processing by the printing apparatus for the plurality of paper sheets on which the plurality of image data generated from the received data are laid out,
   a second bookbinding instruction generation unit configured to generate a second bookbinding instruction to perform finishing processing by the post-processing apparatus for the plurality of paper sheets having undergone the stitching processing in accordance with the first bookbinding instruction, and
   a job output unit configured to output the printing instruction and the first bookbinding instruction to the printing apparatus, and the second bookbinding instruction to the post-processing apparatus.

5. The apparatus according to claim 1, wherein said data determination unit further includes a presenting unit configured to extract a received data candidate addable to the first received data from a plurality of received data and to represent the received data candidate to a user.

6. The apparatus according to claim 1, wherein said size determination unit further includes a change unit configured, when another received data determined by said data determination unit to be added exists, to change the sheet of paper to a sheet of paper of a size in which die single tentative image data containing image data of the other received data fits.

7. The apparatus according to claim 1, wherein the bookbinding mode includes:
   a first bookbinding mode in which a single bound product is generated by a single job,
   a second bookbinding mode in which a plurality of bound products with the same content are generated by a single job, and
   a third bookbinding mode in which a plurality of bound products with different contents are generated by a single job,
   in the second bookbinding mode, respective image data generated from single received data are copied and laid out on a single sheet of paper for the same page, and
   in the third bookbinding mode, image data with the same page number out of a plurality of image data generated from different received data are laid out on a single sheet of paper.

8. A bookbinding printing method of generating, from received data, a job containing a plurality of image data to be printed, a printing instruction, and a bookbinding instruction, and outputting the job to a printing apparatus and post-processing apparatus for generating a bound product, comprising:
   a data determination step of causing a data determination unit to determine, using first received data as a reference, whether to add other received data to processing in a single job;
   a size determination step of causing a size determination unit, when the other received data is determined in the data determination step to be added in a bookbinding mode in which a plurality of bound products are generated by a single job, to regard, as single tentative image data, a plurality of image data which are generated from different received data and laid out on a single sheet of paper, and to determine whether the single tentative image data fits in the single sheet of paper; and a job generation step of causing a job generation unit to generate a job for at least one received data corresponding to image data contained in the single tentative image data determined in the size determination step to fit in the single sheet of paper.

9. A non-transitory computer-readable medium storing a program for causing a computer to function as:

a data determination unit which determines, using first received data as a reference, whether to add other received data to processing in a single job, a size determination unit which, when said data determination unit determines to add the other received data in a bookbinding mode in which a plurality of bound products with different contents are generated by a single job, regards, as single tentative image data, image data with the same page number which are laid out on a single sheet of paper out of a plurality of image data generated from different received data, and determines whether the single tentative image data fits in the single sheet of paper, and a job generation unit which generates a job for at least one received data corresponding to image data contained in the single tentative image data determined by said size determination unit to fit in the single sheet of paper.

* * * * *